United States Patent
Jakubowski et al.

(10) Patent No.: US 11,343,274 B2
(45) Date of Patent: May 24, 2022

(54) NON-SPOOFABLE PRIVACY INDICATOR SHOWING DISABLING OF SENSORS ON A NETWORK-CONNECTED CLIENT DEVICE

(71) Applicant: Meta Platforms, Inc., Menlo Park, CA (US)

(72) Inventors: Richard Jakubowski, Chicago, IL (US); Syed Rameez Mustafa, Fremont, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 118 days.

(21) Appl. No.: 16/562,832

(22) Filed: Sep. 6, 2019

(65) Prior Publication Data

US 2020/0112587 A1  Apr. 9, 2020

Related U.S. Application Data

(60) Provisional application No. 62/742,190, filed on Oct. 5, 2018.

(51) Int. Cl.
*H04L 29/06* (2006.01)

(52) U.S. Cl.
CPC ................. *H04L 63/1466* (2013.01)

(58) Field of Classification Search
CPC .................................................. H04L 63/1466
See application file for complete search history.

(56) References Cited

U.S. PATENT DOCUMENTS

| | | | | |
|---|---|---|---|---|
| 4,291,211 A | * | 9/1981 | Discenza | H01H 21/025 200/311 |
| 6,734,662 B1 | * | 5/2004 | Fenske | G01R 15/148 324/127 |
| 8,090,961 B2 | † | 1/2012 | Yoffe | |
| 8,522,309 B2 | † | 8/2013 | Yoffe | |
| 8,924,708 B2 | † | 12/2014 | Yoffe | |
| 9,029,720 B2 | * | 5/2015 | Strothmann | H01H 21/025 200/315 |
| 10,440,327 B1 | * | 10/2019 | Bytyqi | G06F 3/1454 |
| 2005/0271190 A1 | * | 12/2005 | Linkenhoger | H04M 1/0293 379/93.05 |
| 2009/0013413 A1 | * | 1/2009 | Vera | H04L 63/105 726/30 |

(Continued)

OTHER PUBLICATIONS

PCT International Search Report and Written Opinion, PCT Application No. PCT/US2019/054411, dated Dec. 10, 2019, 10 pages.

(Continued)

*Primary Examiner* — Vance M Little
(74) *Attorney, Agent, or Firm* — Fenwick & West LLP

(57) ABSTRACT

Systems and methods are disclosed herein for activating a sensor of a client device by toggling, at the client device, a position of a switch that connects the sensor to a power source of the client device to an on position. The client device receives user input corresponding to a privacy mode. In response to receiving the user input, the client device disables the sensor by toggling the position of the switch that connects the sensor to the power source to an off position, and enables a privacy indicator by toggling a position of a switch that connects the privacy indicator to a power source to an on position.

20 Claims, 4 Drawing Sheets

(56) References Cited

U.S. PATENT DOCUMENTS

| | | | |
|---|---|---|---|
| 2012/0039020 A1* | 2/2012 | Mathers | H01H 13/702 |
| | | | 361/632 |
| 2014/0173747 A1* | 6/2014 | Govindaraju | G06F 21/53 |
| | | | 726/27 |
| 2015/0082422 A1 | 3/2015 | Yoffe et al. | |
| 2016/0021541 A1* | 1/2016 | Haddad | G06F 21/74 |
| | | | 713/164 |
| 2016/0226917 A1* | 8/2016 | Plagemann | H04L 63/20 |
| 2017/0263254 A1 | 9/2017 | Dewan et al. | |
| 2018/0165472 A1* | 6/2018 | Adams | G06F 21/83 |
| 2020/0143017 A1* | 5/2020 | Yoon | G06N 3/004 |

OTHER PUBLICATIONS

Sony. "User Guide: Personal Computer—VGN-BX500 Series." Sony Corporation, Feb. 15, 2010, pp. 1-217, [Online] [Retrieved May 14, 2020], Retrieved from the internet <URL: https://web.archive.org/web/20100215190613if_/http://www.docs.sony.com:80/release/VGN-BX500_302EN.pdf>.

Todoric, Z. "Hard, Not Soft, Kill Switches." Purism, Sep. 21, 2015, 12 pages, [Online] [Retrieved May 14, 2020], Retrieved from the internet <URL: https://puri.sm/posts/hard-not-soft-kill-switches/>.

\* cited by examiner
† cited by third party

US 11,343,274 B2

NON-SPOOFABLE PRIVACY INDICATOR SHOWING DISABLING OF SENSORS ON A NETWORK-CONNECTED CLIENT DEVICE

CROSS REFERENCE TO RELATED APPLICATIONS

This application claims the benefit of U.S. Provisional Application No. 62/742,190, filed Oct. 5, 2018, which is incorporated by reference in its entirety.

BACKGROUND

This disclosure relates generally to implementing a privacy indicator that cannot be spoofed in a client device. As client devices, such as network-enabled hubs and smart devices, proliferate in users' homes, there is an increasing concern among users that sensors on those client devices (e.g., cameras, microphones, and the like) are collecting information that users prefer to keep private. Moreover, an indicator (e.g., a light-emitting diode (LED)) indicating that such sensors are disabled may be hacked or spoofed by malicious users to falsely show that a privacy mode has been enabled.

SUMMARY

Systems and methods are disclosed herein to implement in a client device an indicator that shows that various sensors of the client device are disabled, where the indicator cannot be spoofed. More specifically, in an embodiment, a hardware block is implemented with physical switches that connect a power source to the indicator and to the sensors of a client device. The hardware block is implemented so that the on or off position of a switch connecting the power source to the indicator is always inverted with respect to the on or off position of a switch connecting the power source to the sensors. Based on this forced inversion of switch position, it is impossible for the privacy indicator to be caused to falsely indicate that a privacy mode is enabled.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
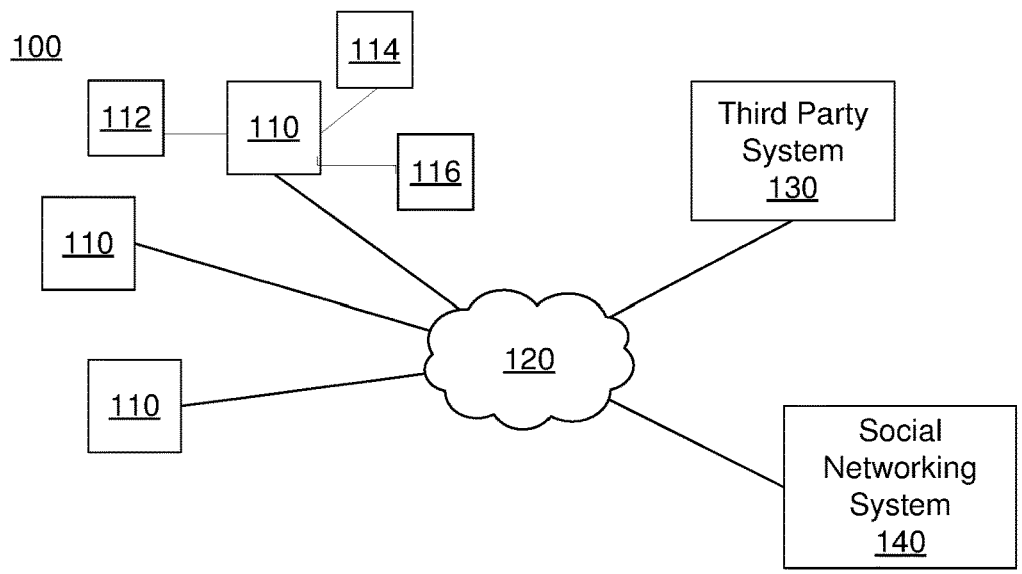
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smart hub, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

As will be described with more detail with respect to FIG. 3, client devices 110 may include one or more privacy indicators 112. Privacy indicator 112 may be a light-emitting device (Such as an LED), may be an output of a user interface, such as an output of a display screen, may be an audio output, and the like. Privacy indicator 112 may be activated to indicate a privacy mode. Client devices 110 also may include one or more sensors 116. Sensors 116 may be any input device, such as a camera or a microphone. When privacy indicator 112 is activated to indicate a privacy mode, this indicates that the one or more sensors 116 of the client device 110 of which privacy indicator 112 is coupled to are disabled.

Figure 2:
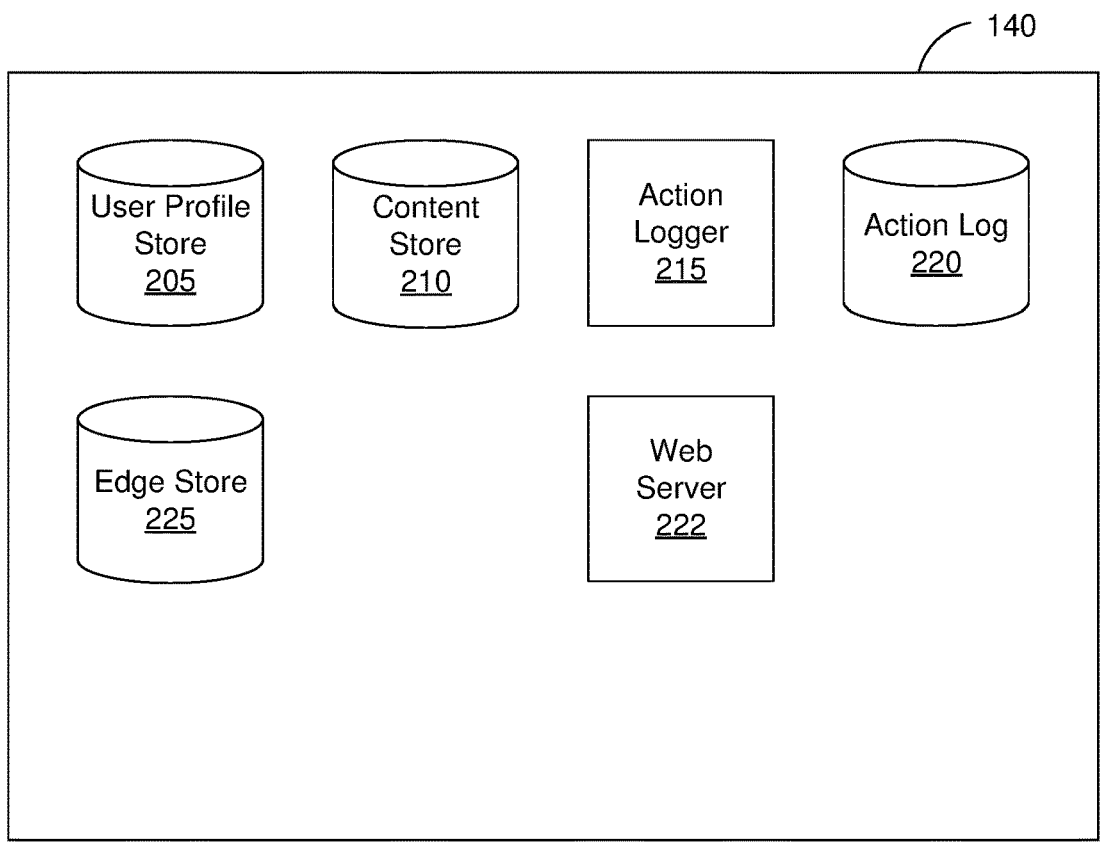
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, and a web server 222. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The web server 222 links the online system 140 via the network 120 to the one or more client devices 110, as well as to the one or more third party systems 130. The web server 222 serves web pages, as well as other content, such as JAVA®, FLASH®, XML and so forth. The web server 222 may receive and route messages between the online system 140 and the client device 110, for example, instant messages, queued messages (e.g., email), text messages, short message service (SMS) messages, or messages sent using any other suitable messaging technique. A user may send a request to the web server 222 to upload information (e.g., images or videos) that are stored in the content store 210. Additionally, the web server 222 may provide application programming interface (API) functionality to send data directly to native client device operating systems, such as IOS®, ANDROID™, or BlackberryOS.

Figure 3:
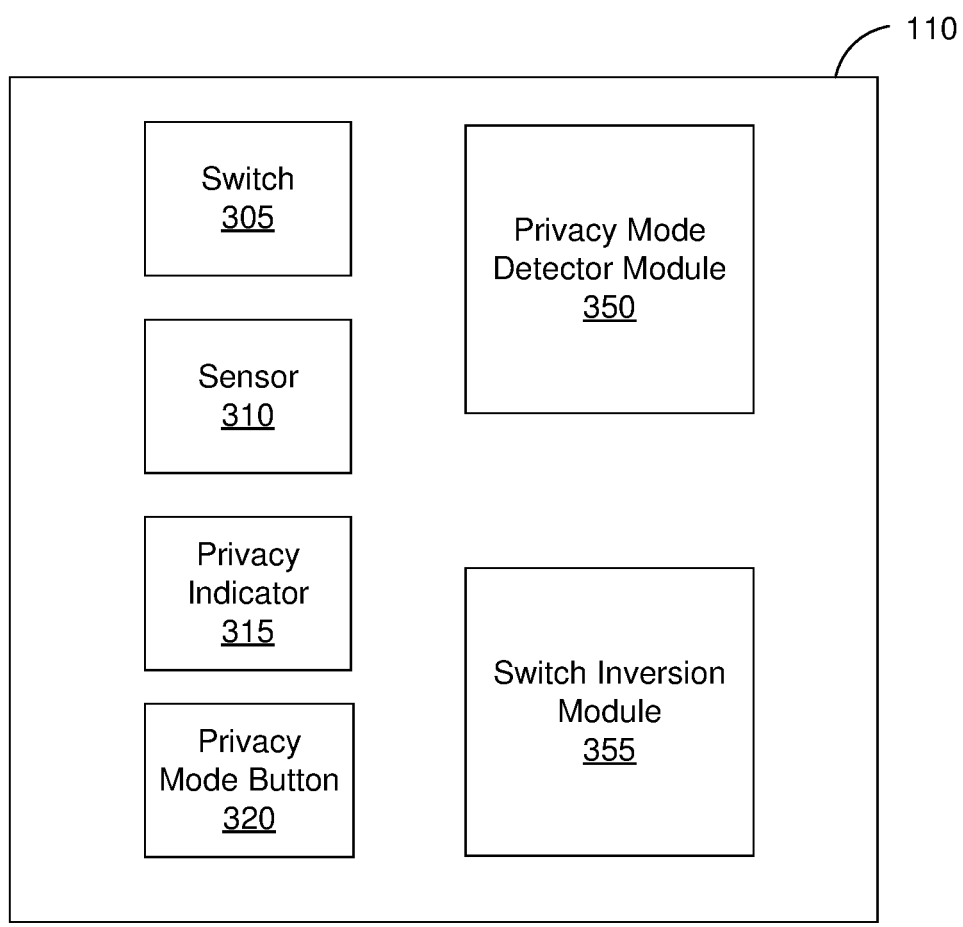
FIG. 3 is a block diagram of a client device, in accordance with an embodiment.

FIG. 3 is a block diagram of a client device, in accordance with an embodiment. Specifically, FIG. 3 depicts exemplary detailed components of client device 110. The detailed components may include hardware, such as switch 305, sensor 310, privacy indicator 315, and/or button 320. The components may also include modules, that when executed by a processor of client device 110, cause client device 110 to perform certain operations. These modules may include privacy mode detector module 350 and switch inversion module 355.

Switch 305 may be a hardware switch, or may be a software switch. Switch 305 connects sensor 310 and privacy indicator 315 to a power source and/or processing circuitry of client device 110. The term "toggled on," as used herein, refers to a scenario where a component of client device 110 is connected to a power source and/or processing circuitry of client device 110. Likewise, the term "toggled off," as used herein, refers to a scenario where a component of client device 110 is disconnected from a power source and/or processing circuitry of client device 110. Where switch 305 is a hardware switch, switch 305 is hardwired in a manner that ensures that when privacy indicator 315 is toggled on, sensor 310 is toggled off. Where switch 305 is programmed into software, the software is programmed in a manner that ensures that privacy indicator 315 cannot be toggled on when sensor 310 is toggled on, and vice versa, thus ensuring that when one of privacy indicator 315 and sensor 310 is on, the other is off. When a privacy mode is active, privacy indicator 315 is toggled on, and sensor 310 is toggled off. When a privacy mode is not active, privacy indicator 315 is toggled off, and sensor 310 is toggled on.

Sensor 310 is recited in the singular, but may include one or more sensors. Functionality described with respect to sensors 116 equally applies to sensor 310, and vice versa. Sensor 310 may be any sensor of client device 110 that detects information relating to human activity. For example, sensor 310 may be a camera, which collects images and/or video that may capture human activity. Sensor 310 may be, as another example, a microphone, which collects audio that may be spoken by a human being. In an embodiment, client device 110 may have some sensors that are not part of sensor 310, and thus do not toggle off when privacy indicator 315 is toggled on. The sensors that are, and are not, part of sensor 310, may be defined by a user of client device 110, or by an administrator or manufacturer of client device 110 and/or an administrator of online system 140.

Privacy indicator 315 may be a component that indicates status to a user. Functionality described with respect to privacy indicators 112 equally applies to privacy indicator 315, and vice versa. In an embodiment, privacy indicator 315 is a light source, such as a light-emitting diode. Privacy indicator 315 may, as another example, be a sound source, such as a speaker with an audio output that confirms that the privacy mode is activated. It is an advantage to use continuous indicators, such as a light source, to indicate that the privacy mode is active, in that light sources provide continuous confirmation in a non-intrusive manner to users.

Privacy indicator 315 may be customized based on user input. For example, a user may select a blue LED light be emitted, rather than a red LED light. Customization may relate to what is output (e.g. LED color, words output, audio output), and/or intensity with which it is output (e.g., brightness of LED, volume of audio alert, whether alert is continuous or periodic, etc.). Privacy indicator 315 may alternatively, or additionally, be customized based on information in user profile store 205 (e.g., a preference for the color blue over red determined in user profile store; an indication that the user sleeps from 11 pm to 8 am and thus the privacy indicator should be disabled during those hours notwithstanding that the sensor 310 is also disabled, etc.).

Button 320 may be a physical button on client device 110 that, when depressed, activates a privacy mode. Button 320, when depressed again, may deactivate the privacy mode. Button 320 may physically link to switch 305 where switch 305 is a hardware switch, thus causing, through a mechanical operation, switch 305 to toggle between privacy mode being active and inactive as button 320 is depressed. Button 320 may be a virtual button, or may be omitted entirely in favor of a graphical user interface (e.g., on client device 110, or on another device communicatively coupled to client device 110) through which a user may command client device 110 to enter privacy mode.

Privacy mode detector module 350 detects whether a privacy mode is being toggled from active to inactive, or from inactive to active. Where button 320 is included in client device 110, privacy mode detector module 350 detects whether button 320 is depressed, and if so, determines that the privacy mode is to be toggled. Where button 320 is excluded, and a privacy mode is entered by way of a command signal through some other means, privacy mode detector module 350 determines whether such a command is received, and responsive to such a command being received, determines that the privacy mode is being toggled.

Where switch 305 is a software switch, or where switch 305 is a hardware switch that is not physically linked to button 320, switch inversion module 355 is commanded to toggle switch 305 when privacy mode detector module 350 detects that privacy mode is being toggled. Switch inversion module 305 commands the switch to toggle in such a scenario.

Example Implementation of Non-Spoofable Privacy Indicator

Figure 4:
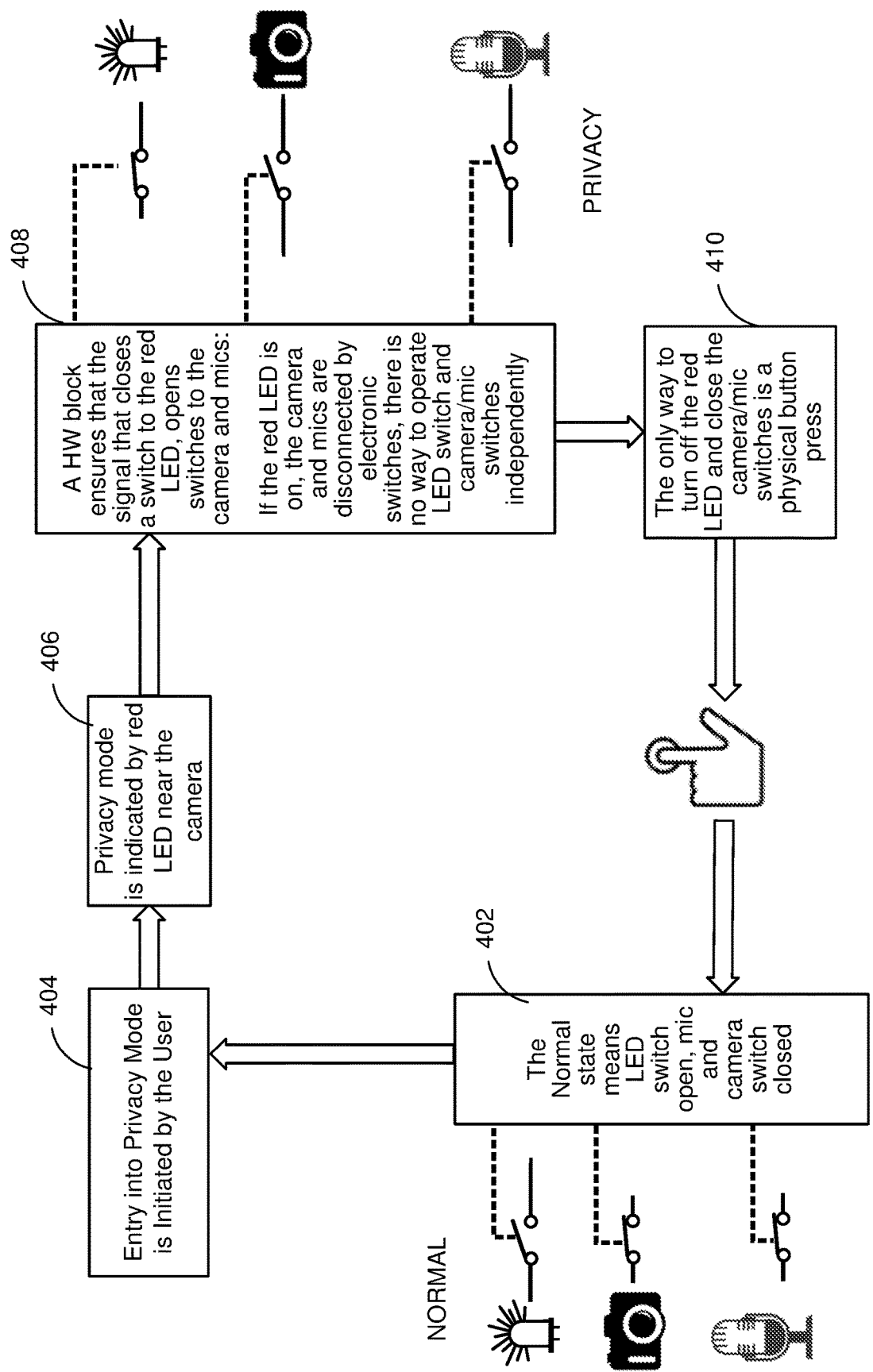
FIG. 4 is a flow diagram of an implementation of a non-spoofable privacy indicator, in accordance with an embodiment.

FIG. 4 is a flow diagram of an implementation of a non-spoofable privacy indicator, in accordance with an embodiment. Stage 402 describes a normal state of a client device. As illustrated, the normal state is a state where sensors of a client device (e.g., sensors 116 of a client device 110) are active, and a privacy indicator (e.g., privacy indicator 112) of the client device is inactive. The manner in which the sensors are caused to be active, while the privacy indicator is caused to be inactive, is by ensuring, through either a hardware implementation or a software module, that when a switch connects the sensors to a power source, a switch that would connect the privacy indicator to the power source is disconnected. By maintaining inverted positions, the privacy indicator cannot be activated simultaneously with an activation of the sensors. Note that while only a camera and microphone are depicted in FIG. 4, any other type of sensor 310 is within the scope of the term sensor as used herein.

Stage 404 describes an entry into privacy mode being initiated by the user. The entry into the privacy mode is initiated when the client device detects user input indicating that the user wishes to enter a privacy mode (e.g., depression of button 320). The illustrative example depicted in FIG. 4 shows a physical button, where, when the client device detects that the button is depressed, the client device detects that the user has initiated an entry into the privacy mode. However, the client device may detect other means of entry into the privacy mode having been initiated by the user. For example, the client device may detect a voice command from the user (e.g., using the depicted microphone) commanding the client device to enter the privacy mode. As another example, the client device may detect a gesture from the user that corresponds to a command to enter the privacy mode (e.g., by way of a touch screen or touch pad). As yet another example, the client device may receive a command electronically (e.g., by way of a wireless signal such as a Bluetooth signal) to enter the privacy mode. Further activation means are discussed above with respect to FIG. 3.

Stage 406 and stage 408 together describe an illustrative example of how the client device may respond to detection of entry into the privacy mode. For example, as described at stage 406, a privacy mode may be indicated by a privacy indicator (in this case a red LED) being activated. As described above, the privacy indicator may be any privacy indicator 315 and may indicate that the privacy mode has been entered using any output perceptible or detectable by a human being. Stage 408 describes the hardware configuration of switches that achieve the privacy mode. As depicted, the switches that were depicted at stage 402 have had their positions inverted, where the switch connecting the sensors to the power source is now set to an off position, and where the switch connecting the privacy indicator to the power source is now set to an on position. In some embodiments, the client device is hard-wired to, when the above-described physical button is depressed, flip these switches. In other embodiments, the privacy mode is controlled by software, where a processor of the client device commands a controller to flip the switches to a mode opposite their previous mode. In a software implementation, to ensure that the privacy indicator is secure and cannot be spoofed, the software module must execute on a separate micro-processor (e.g., with respect to the main processor), where the separate micro-processor's software cannot be changed through an external interface (e.g., a connection to a network such as network 120, or a data connection port).

In any case, as illustrated at stage 410 whether hardwired or programmed through software, the switches providing power to the sensors is designed to always be at an inverted position from the switch providing power to the privacy indicator, such that the privacy indicator cannot be on when the switches are active, and vice versa. This ensures that a malicious user cannot spoof or otherwise fake a privacy mode being activated. Note that stage 410 pertains only to the specific embodiment where a physical button must be pressed to activate the privacy mode; as described above, in other embodiments, there are other means to activate and de-activate the privacy mode. For example, while in some embodiments the privacy mode will cut off all sensors of the client device, thus disabling receipt of any kind of user input, in other embodiments, the client device may be configured to detect some input (e.g., an electronic command from a different client device) that indicates that the privacy mode should be disabled. As an example, if a user's smart hub is in a privacy mode, but the user's smart phone is not in a privacy mode, the user may use an application on his smart phone to communicate to the privacy hub to de-activate the privacy mode. If the client device receives such communications, the client device may determine whether the communications satisfy a predetermined command indicating that the privacy mode should be enabled/disabled, and if such a condition is satisfied, the client device may activate/deactivate the privacy mode.

While the disclosure describes entering a privacy mode by disconnecting the sensors from a power source while the privacy indicator is connected to a power source, and exiting the privacy mode by connecting the sensors to the power source and disconnecting the privacy sensor from a power source, other implementations are within the scope of the disclosure. For example, rather than disconnect the sensors from a power source, a privacy mode may be achieved by disconnecting data from the sensors, or causing the sensors to be in a hardware shut down state where it is not possible for the sensors to function. Any of these privacy mode implementations are equally within the scope of the disclosure, and may be implemented while the privacy indicator is on, and disabled when the privacy indicator is off.

Exemplary Data Flow for Toggling of Non-Spoofable Privacy Indicator

Figure 5:
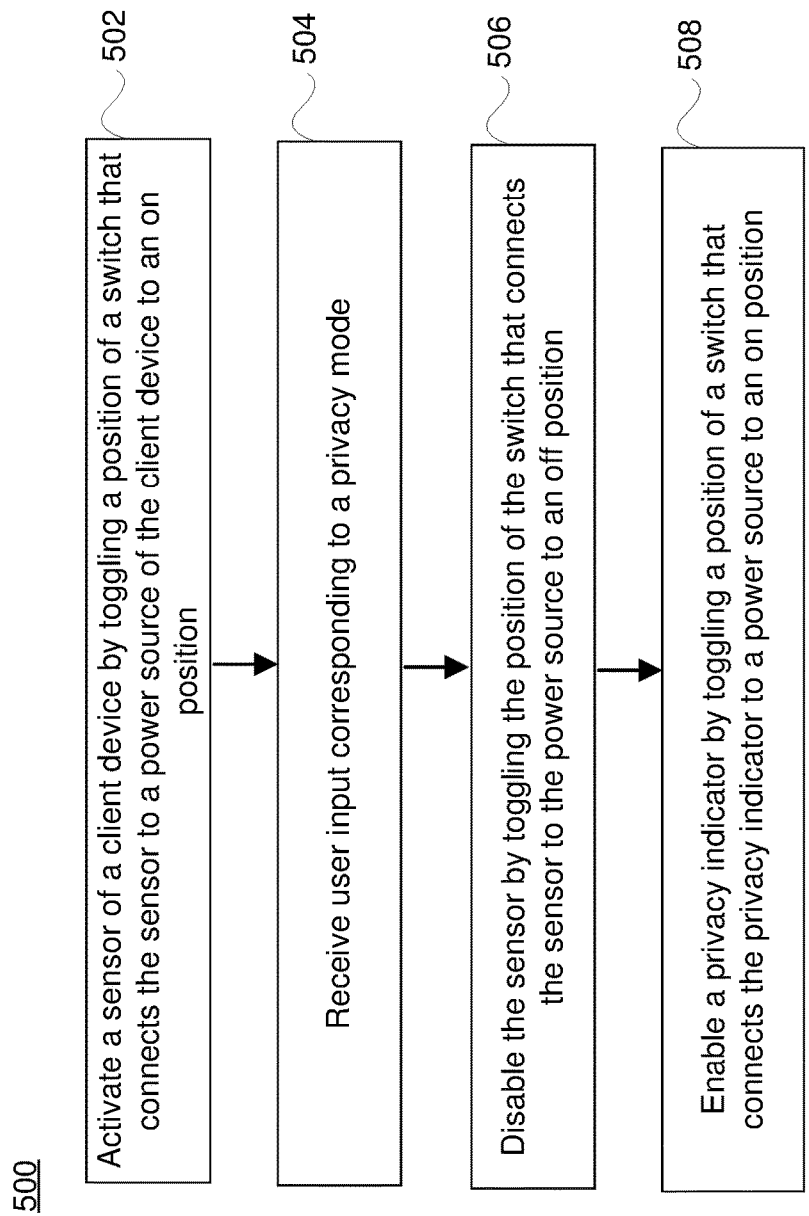
FIG. 5 is a flow diagram of an exemplary data flow for toggling a non-spoofable privacy indicator.

FIG. 5 is a flow diagram of an exemplary data flow for toggling a non-spoofable privacy indicator. Process 500 begins with activation 502 of a sensor (e.g., sensor 110) of a client device (e.g., client device 110) by toggling a position of a switch (e.g., switch 305) that connects the sensor to a power source of the client device to an on position. The client device receives 504 user input corresponding to a privacy mode (e.g., depression of button 320). The client device disables 506 the sensor by toggling the position of the switch that connects the sensor to the power source to an off position. The client device enables 508 a privacy indicator (e.g., privacy indicator 315) by toggling a position of a switch that connects the privacy indicator to a power source to an on position.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    activating a plurality of sensors of a client device by toggling, at the client device, a position of a plurality of switches, each switch of the plurality of switches connecting a respective sensor of the plurality of sensors to a power source of the client device to an on position, the plurality of switches together toggled to an activated state during the activating, the activating being responsive to a manipulation of a physical actuator of the client device, the manipulation corresponding to a mode other than a privacy mode;
    receiving, using the client device, user input corresponding to a privacy mode based on a further manipulation of the physical actuator;
    in response to receiving the user input:
        disabling, at the client device, the plurality of sensors by toggling the position of each switch that connects the plurality of sensors to the power source to an off position, the plurality of switches together toggled to a disabled state during the disabling; and
        enabling, at the client device, a privacy indicator by toggling a position of a switch that connects the privacy indicator to the power source to an on position, the position of the switch that connects the privacy indicator to the power source toggling together with the toggling of the plurality of switches during their disabling, wherein the switch that connects the privacy indicator to the power source is, relative to the plurality of switches, hardwired to inversely provide power to the plurality of sensors and the privacy indicator, thereby ensuring the plurality of sensors are not activated when the privacy indicator is enabled, and that the privacy indicator is disabled when the plurality of sensors are activated.

2. The method of claim 1, wherein the privacy indicator is a light-emitting diode (LED), and wherein the LED shines light when the switch that connects the privacy indicator to the power source is toggled to the on position.

3. The method of claim 1, wherein receiving the user input comprises detecting a depression of a physical button on the client device.

4. The method of claim 1, wherein receiving the user input comprises detecting a command from the user by way of a signal, and wherein the method further comprises:
   determining whether the command satisfies a condition; and
   in response to determining that the command satisfies the condition, determining that the user input corresponds to the privacy mode.

5. The method of claim 4, wherein the command is detected by way of at least one of a voice sensor, an on-screen touch interface, and a wireless signal.

6. The method of claim 1, wherein the disabling of the sensor and enabling of the privacy indicator, and vice versa, is commanded by a separate micro-processor from a main processor, the main processor providing other functionality of the client device.

7. The method of claim 1, wherein the privacy indicator is enabled in a manner based on a preference indicated by a profile of a user of the client device.

8. A computer program product comprising a non-transitory computer-readable storage medium containing computer program code for:
   activating a plurality of sensors of a client device by toggling, at the client device, a position of a plurality of switches, each switch of the plurality of switches connecting a respective sensor to a power source of the client device to an on position, the plurality of switches together toggled to an activated state during the activating, the activating being responsive to a manipulation of a physical actuator of the client device, the manipulation corresponding to a mode other than a privacy;
   receiving, using the client device, user input corresponding to a privacy mode based on a further manipulation of the physical actuator;
   in response to receiving the user input:
      disabling, at the client device, the plurality of sensors by toggling the position of each switch that connects the plurality of sensors to the power source to an off position, the plurality of switches together toggled to a disabled state during the disabling; and
      enabling, at the client device, a privacy indicator by toggling a position of a switch that connects the privacy indicator to the power source to an on position, the position of the switch that connects the privacy indicator to the power source toggling together with the toggling of the plurality of switches during their disabling, wherein the switch that connects the privacy indicator to the power source is, relative to the plurality of switches, hardwired to inversely provide power to the plurality of sensors and the privacy indicator, thereby ensuring the plurality of sensors are not activated when the privacy indicator is enabled, and that the privacy indicator is disabled when the plurality of sensors are activated.

9. The computer program product of claim 8, wherein the privacy indicator is a light-emitting diode (LED), and wherein the LED shines light when the switch that connects the privacy indicator to the power source is toggled to the on position.

10. The computer program product of claim 8, wherein receiving the user input comprises detecting a depression of a physical button on the client device.

11. The computer program product of claim 8, wherein receiving the user input comprises detecting a command from the user by way of a signal, and wherein the method further comprises:
    determining whether the command satisfies a condition; and
    in response to determining that the command satisfies the condition, determining that the user input corresponds to the privacy mode.

12. The computer program product of claim 11, wherein the command is detected by way of at least one of a voice sensor, an on-screen touch interface, and a wireless signal.

13. The computer program product of claim 8, wherein the disabling of the sensor and enabling of the privacy indicator, and vice versa, is commanded by a separate micro-processor from a main processor, the main processor providing other functionality of the client device.

14. The computer program product of claim 8, wherein the privacy indicator is enabled in a manner based on a preference indicated by a profile of a user of the client device.

15. A system comprising:
    one or more processors; and
    a non-transitory computer-readable storage medium including instructions that, when executed, cause the processor to perform the steps of:
       activating a plurality of sensors of a client device by toggling, at the client device, a position of a plurality of switches, each switch of the plurality of switches connecting a respective sensor to a power source of the client device to an on position, the plurality of switches together toggled to an activated state during the activating, the activating being responsive to a manipulation of a physical actuator of the client device, the manipulation corresponding to a mode other than a privacy mode;
       receiving, using the client device, user input corresponding to a privacy mode based on a further manipulation of the physical actuator;
       in response to receiving the user input:
          disabling, at the client device, the plurality of sensors by toggling the position of each switch that connects the plurality of sensors to the power source to an off position, the plurality of switches together toggled to a disabled state during the disabling; and
          enabling, at the client device, a privacy indicator by toggling a position of a switch that connects the privacy indicator to the power source to an on position, the position of the switch that connects the privacy indicator to the power source toggling together with the toggling of the plurality of switches during their disabling, wherein the switch that connects the privacy indicator to the power source is, relative to the plurality of switches, hardwired to inversely provide power to the plurality of sensors and the privacy indicator, thereby ensuring the plurality of sensors are not activated when the privacy indicator is enabled, and that the privacy indicator is disabled when the plurality of sensors are activated.

16. The system of claim 15, wherein the privacy indicator is a light-emitting diode (LED), and wherein the LED shines light when the switch that connects the privacy indicator to the power source is toggled to the on position.

17. The system of claim 15, wherein receiving the user input comprises detecting a depression of a physical button on the client device.

18. The system of claim 15, wherein receiving the user input comprises detecting a command from the user by way of a signal, and wherein the method further comprises:
   determining whether the command satisfies a condition; and
   in response to determining that the command satisfies the condition, determining that the user input corresponds to the privacy mode.

19. The system of claim 18, wherein the command is detected by way of at least one of a voice sensor, an on-screen touch interface, and a wireless signal.

20. The system of claim 15, wherein the privacy indicator is enabled in a manner based on a preference indicated by a profile of a user of the client device.

* * * * *